United States Patent
Kaneko et al.

[11] Patent Number: 6,022,605
[45] Date of Patent: Feb. 8, 2000

[54] OPTICAL RECORDING MEDIUM AND RECORDING/ERASING METHOD THEREFOR

[75] Inventors: Kazuhiro Kaneko; Tomohiro Onda, both of Tochigi-ken, Japan

[73] Assignee: Kao Corporation, Tokyo, Japan

[21] Appl. No.: 09/031,549

[22] Filed: Feb. 27, 1998

[30] Foreign Application Priority Data

| Feb. 28, 1997 | [JP] | Japan | 9-046225 |
| Aug. 5, 1997 | [JP] | Japan | 9-210745 |
| Oct. 17, 1997 | [JP] | Japan | 9-285785 |
| Jan. 16, 1998 | [JP] | Japan | 10-006838 |

[51] Int. Cl.$^7$ ............................................. B32B 3/00
[52] U.S. Cl. .................. 428/64.1; 428/64.2; 428/64.4; 428/64.5; 428/913; 430/270.13; 430/495.1; 430/945; 369/283; 369/288
[58] Field of Search ................... 428/64.1, 64.2, 428/64.4, 64.5, 913; 430/270.12, 270.13, 495.1, 945; 369/283, 288

[56] References Cited

U.S. PATENT DOCUMENTS

| 3,530,441 | 9/1970 | Ovshinsky . | |
| 4,900,598 | 2/1990 | Suzuki et al. | 428/64.1 |
| 4,975,355 | 12/1990 | Suzuki et al. | 436/346 |
| 5,202,881 | 4/1993 | Suzuki et al. | 369/284 |

FOREIGN PATENT DOCUMENTS

| 60-177446 | 9/1985 | Japan . |
| 61-219692 | 9/1986 | Japan . |
| 61-270190 | 11/1986 | Japan . |
| 62-19490 | 1/1987 | Japan . |
| 62-73438 | 4/1987 | Japan . |
| 1-251340 | 10/1989 | Japan . |
| 1-303643 | 12/1989 | Japan . |
| 1-307034 | 12/1989 | Japan . |
| 3-73384 | 3/1991 | Japan . |
| 3-82593 | 4/1991 | Japan . |
| 3-99884 | 4/1991 | Japan . |
| 3-240590 | 10/1991 | Japan . |
| 4-232779 | 8/1992 | Japan . |
| 4-267192 | 9/1992 | Japan . |
| 6-166268 | 6/1994 | Japan . |

*Primary Examiner*—Elizabeth Evans
*Attorney, Agent, or Firm*—Oblon, Spivak, McClelland, Maier & Neustadt, P.C.

[57] ABSTRACT

The present invention aims at improving C/N, erasing ratio, modulation factor, recording sensitivity, and recording/erasing repeatability characteristics of a phase-change type optical recording medium.

The recording layer of the optical recording medium is therefore formed of a chalcopyrite type compound having a composition represented by the formula:

$$Au_\alpha In_\beta Sb_\gamma Te_\delta$$

wherein
0 atomic % < $\alpha$ ≤ 25 atomic %;
1 atomic % ≤ $\beta$ ≤ 18 atomic %;
30 atomic % ≤ $\gamma$ ≤ 75 atomic %; and
15 atomic % ≤ $\delta$ ≤ 45 atomic %;
in which 99 atomic % ≤ $\alpha+\beta+\gamma+\delta$ ≤ 100 atomic %. Further, this optical recording medium is used such that the relative speed of the recording layer at recording/erasing is from 1 m/sec to 20 m/sec relative to the light beam.

8 Claims, 2 Drawing Sheets

OPTICAL RECORDING MEDIUM AND RECORDING/ERASING METHOD THEREFOR

BACKGROUND OF THE INVENTION (1) Field of The Invention

The present invention relates to an optical recording medium having a recording layer made of phase-change type recording material, and to a recording/erasing method therefor.

(2) Related art of The Invention

There have been recently remarked optical recording mediums which can be recorded with high density, and in which the recorded information can be erased and rewritten. In a phase-change type optical recording medium among these overwriteable optical recording mediums, the crystal state of the recording layer is changed by irradiating a laser beam thereto, and there is detected that change of reflectance of the recording layer, which is caused by such a change of state. The phase-change type of optical recording medium can be overwritten by a single light beam, so that it is superior to a magneto-optical recording medium, in that the optical system of driving apparatus for the former is simpler than that for the latter.

As material of a recording layer of the phase-change type optical recording medium, there are often adopted Ge—Te type materials which have a large difference of reflectance between crystal state and amorphous state, and have a relatively large stability in an amorphous state. The representative examples of such materials include chalcogen-type alloy materials such as Ge—Te, Ge—Te—Sb—S, Ge—Te—S, Ge—Se—S, Ge—Se—Sb, Ge—As—Se, In—Te, Se—Te, Se—As, as disclosed in U.S. Pat. No. 3,530,441.

Further, there have been proposed: the Ge—Te alloy materials such as added with Au (Japanese Unexamined Patent Publication No.61-219692), Sn and Au (Japanese Unexamined Patent Publication No.61-270190), Pd (Japanese Unexamined Patent Publication No.62-19490) aiming at improving the stability and high crystallization speed; and the Ge—Te—Se—Sb material with a specified composition ratio aiming at improving the recording/erasing repeatability characteristics (Japanese Unexamined Patent Publication No.62-73438).

However, none of these materials completely satisfies all of the characteristics required in a recording layer of a phase-change type overwriteable optical recording medium. Particularly, it has become the most important object to improve the recording sensitivity and erasing sensitivity, to avoid deterioration of erase ratio due to erase failure at overwriting, and to improve the life span of recording/erasing repeatability of both the recorded and unrecorded portions.

In view of the above, it has been recently proposed to apply a compound called "chalcopyrite". The chalcopyrite type compounds have been widely investigated as compound type semiconductor materials, and applied such as to solar cell. The chalcopyrite type compounds have a composition represented by I b-III b-IVb$_2$ or II b-IVb-Vb$_2$ in terms of the chemical periodic table, and have a structure comprising layered two diamond-structures.

It is known that, among these chalcopyrite type compounds, AgInTe$_2$ can be particularly used as a material of recording layer of optical recording medium, by diluting it such as with Sb and Bi (Japanese Unexamined Patent Publication Nos. 3-240590, 3-99884, 3-82593, and 3-73384).

In addition to such phase-change type optical recording mediums adopting chalcopyrite type compounds, there are disclosed other phase-change type optical recording mediums in which a AgSbTe$_2$ phase is created upon crystallization of recording layer, such as in Japanese Unexamined Patent Publication Nos. 4-267192, 4-232779, and 6-166268. The optical recording mediums adopting these recording materials have an improved C/N, erase ratio, modulation factor, and recording sensitivity.

However, the recording layer of the chalcopyrite compound having the aforementioned composition has a life span of recording/erasing repeatability in the order of several thousand times at the utmost. Thus, there remains such a problem that the chalcopyrite type compound is not necessarily complete, viewing the fact that the life span of recording/erasing repeatability of magneto-optical disks is hundred thousand times.

SUMMARY OF THE INVENTION

In view of the aforementioned problem in the conventional, it is therefore an object of the present invention to provide an optical recording medium which has an improved C/N, erase ratio, modulation factor, and recording sensitivity, as well as improved recording/erasing repeatability characteristics.

The present invention therefore provides an optical recording medium having a recording layer consisting of a composition represented by the formula:

$$Au_\alpha In_\beta Sb_\gamma Te_\delta$$

wherein
0 atomic % $< \alpha \leq$ 25 atomic %;
1 atomic % $\leq \beta \leq$ 18 atomic %;
30 atomic % $\leq \gamma \leq$ 75 atomic %; and
15 atomic % $\leq \delta \leq$ 45 atomic %;
in which 99 atomic % $\leq \alpha+\beta+\gamma+\delta \leq$ 100 atomic %.

According to the optical recording medium having such a constitution, there are improved its recording/erasing repeatability characteristics, in addition to its C/N, erase ratio, modulation factor, and recording sensitivity. Particularly, this optical recording medium is preferable, when it is used at a speed of the recording layer of from 1 m/sec to 20 m/sec relative to a light beam, at recording/erasing of information.

Meanwhile, there should be noted those techniques of the recording layer of which might include Au, In, Sb, and Te, are such as disclosed in Japanese Unexamined Patent Publication Nos. 60-177446, 1-307034, 1-303643, and 1-251340.

Although in the first three Japanese Unexamined Patent Publication (Kokai) Nos. 60-177446, 1-307034, and 1-303643, there are listed so many elements which constitute a recording layer, the disclosures do not go beyond that the combination of Au, In Sb, and Te might be theoretically possible among extremely wide varieties of combinations of such elements. These publications thus fail to describe or even suggest a recording layer which includes the aforementioned specific elements at the specific ratio according to the present invention.

In the last Japanese Unexamined Patent Publication No. 1-251340, there is disclosed a recording layer which includes the four elements, Au, In, Sb and Te, the constitutional ratio of which is specified so widely. Concretely, the ratio seems to be varied in such ranges that Au is from 0 inclusive to 30 atomic %, In is from 5 to 80 atomic %, Sb is from 10 to 90 atomic %, and Te is from 0 inclusive to 50 atomic %, which means that at a glance the constitutional ratio of the four elements according to the present invention might be covered incidentally.

Nonetheless, in this Japanese Unexamined Patent Publication No. 1-251340, it is recognized that Au and Te may be 0 atomic % (i.e., Au and Te are not essentially constitutional requirements), which means that the constitutional ratio of respective elements in this publication never corresponds to that of the present invention. This publication also fails to describe or even suggest the improvement of the characteristics (such as C/N, erase ratio, modulation factor, recording sensitivity, and recording/erasing repeatability characteristics) which the present invention aims at.

In the optical recording medium according to the present invention, when the recording layer is used particularly at a speed of from 1 m/sec to 3 m/sec relative to a light beam, at recording/erasing of information, the aforementioned $\alpha$, $\beta$, $\gamma$, and $\delta$ may have the following values:

0 atomic %$<\alpha\leq$8 atomic %;
10 atomic %$\leq\beta\leq$18 atomic %;
42 atomic %$\leq\gamma\leq$49 atomic %; and
34 atomic %$\leq\delta\leq$41 atomic %;
in which 99 atomic %$\leq\alpha+\beta+\gamma+\delta\leq$100 atomic %. The composition range may be slightly widened such that the $\alpha$, $\beta$, $\gamma$, and $\delta$ have the following values:
0 atomic %$<\alpha\leq$25 atomic %;
7 atomic %$\leq\beta\leq$18 atomic %; and
32 atomic %$\leq\delta\leq$45 atomic %, when 30 atomic %$\leq\gamma<$45 atomic %;
30 atomic %$\leq\delta\leq$45 atomic %, when 45 atomic %$\leq\gamma<$49 atomic %;
35 atomic %$\leq\delta\leq$45 atomic %, when 49 atomic %$\leq\gamma\leq$55 atomic %;
in which 99 atomic %$\leq\alpha+\beta+\gamma+\delta\leq$100 atomic %. In these values, the composition range is particularly preferable, when the $\alpha$, $\beta$, $\gamma$, and $\delta$ have the following values:
3 atomic %$\leq\alpha\leq$14 atomic %;
11 atomic %$\leq\beta\leq$14 atomic %;
37 atomic %$\leq\gamma\leq$48 atomic %; and
36 atomic %$\leq\delta\leq$41 atomic %.

The recording layer having the above composition shows an improved recording/erasing characteristics, particularly when the recording layer is used at a speed of from 1 m/sec to 3 m/sec relative to a light beam.

In the optical recording medium according to the present invention, when the relative speed of the recording layer relative to a light beam at recording/erasing of information is from 3 m/sec to 5 m/sec, the $\alpha$, $\beta$, $\gamma$, and $\delta$ may preferably have the following values:

0 atomic %$<\alpha\leq$22 atomic %;
4 atomic %$\leq\beta\leq$18 atomic %;
33 atomic %$\leq\gamma\leq$62 atomic %; and
26 atomic %$\leq\delta\leq$42 atomic %;
in which 99 atomic %$\leq\alpha+\beta+\gamma+\delta\leq$100 atomic %.

Further, when the aforementioned relative speed is from 5 m/sec to 7 m/sec, the $\alpha$, $\beta$, $\gamma$, and $\delta$ may preferably have the following values:

0 atomic %$<\alpha\leq$17 atomic %;
3 atomic %$\leq\beta\leq$17 atomic %;
41 atomic %$\leq\gamma\leq$67 atomic %; and
24 atomic %$\leq\delta\leq$36 atomic %;
in which 99 atomic %$\leq\alpha+\beta+\gamma+\delta\leq$100 atomic %.

Further, when the aforementioned relative speed is from 7 m/sec to 20 m/sec, the $\alpha$, $\beta$, $\gamma$, and $\delta$ may preferably have the following values:

0 atomic %$<\alpha\leq$25 atomic %;
1 atomic %$\leq\beta\leq$17 atomic %;
43 atomic %$\leq\gamma\leq$75 atomic %; and
15 atomic %$\leq\delta\leq$34 atomic %;
in which 99 atomic %$\leq\alpha+\beta+\gamma+\delta\leq$100 atomic %.

As mentioned above, for the recording layer of the optical recording medium of the present invention, there exist compositional ratios of Au, In, Sb and To preferable for improving the recording/erasing characteristics, corresponding to the speed of the recording layer relative to the light beam during recording and erasing. !if the compositional ratio of Au, In, Sb and Te is outside the above compositional range at the respective relative speeds, the recording/erasing characteristics of the optical recording medium is considerably deteriorated.

Concretely, if the compositional ratio $\alpha$ of Au becomes 0 in the aforementioned present invention, the crystal transition speed is lowered, deteriorating the erase ratio. Further, the life span of recording/erasing repeatability is shortened. Conversely, if $\alpha$ exceeds the aforementioned range, the crystal transition speed becomes so fast that a sufficient recording is hardly attained If the compositional ratio $\beta$ of In becomes less than the aforementioned range, the crystal transition speed is so lowered that the erasing becomes difficult. Further, life span of recording/erasing repeatability is shortened. If $\beta$ exceeds the aforementioned range, the crystal transition speed is increased, but a due modulation factor is hardly obtained.

If the compositional ratio $\gamma$ of Sb becomes less than the aforementioned range, the crystal transition speed is so lowered that the erasing becomes difficult. If $\gamma$ exceeds the aforementioned range, the crystal transition speed is too much increased so that a sufficient recording is hardly obtained. Further, the modulation factor is deteriorated.

If the compositional ratio $\delta$ of Te becomes less than the aforementioned range, the crystal transition speed is too much increased so that a sufficient recording is hardly obtained. If $\delta$ exceeds the aforementioned range, the crystal transition speed is so lowered that the erasing becomes difficult. Then, the absorption coefficient is increased thereby decreasing the optical interference effect due to multiple reflection at a dielectric layer, so that C/N is deteriorated.

In a recording and erasing method for an optical recording medium according to the present invention, wherein the medium comprises a recording layer consisting of a composition represented by the formula:

$$Au_\alpha In_\beta Sb_\gamma Te_\delta$$

wherein
0 atomic %$<\alpha\leq$25 atomic %;
1 atomic %$\leq\beta\leq$18 atomic %;
30 atomic %$\leq\gamma\leq$75 atomic %; and
15 atomic %$\leq\delta\leq$45 atomic %;
in which 99 atomic %$\leq\alpha+\beta+\gamma+\delta\leq$100 atomic %,
recording and erasing of information to and from the recording layer is performed at a speed of from 1 m/sec to 20 m/sec of the recording layer relative to a light beam.

In case that the $\alpha$, $\beta$, $\gamma$, and $\delta$ in the formula of the recording layer have the following values:

0 atomic %<α≦8 atomic %;

10 atomic %≦β≦18 atomic %;

42 atomic %≦γ≦49 atomic %; and 34 atomic %≦δ≦41 atomic %;

in which 99 atomic %≦α+β+γ+δ≦100 atomic %, the relative speed during the recording and erasing may be preferably from 1 m/s to 3 m/s. Similarly, in case that the α, β, γ, and δ in the formula of the recording layer have the following values:

0 atomic %<α≦25 atomic %;

7 atomic %≦β≦18 atomic %; and 32 atomic %≦δ≦45 atomic %, when 30 atomic %≦γ<45 atomic %;

30 atomic %≦δ≦45 atomic %, when 45 atomic %≦γ<49 atomic %;

35 atomic %≦δ≦45 atomic %, when 49 atomic %≦γ≦55 atomic %;

in which 99 atomic %≦α+β+γ+δ≦100 atomic %, the relative speed during the recording and erasing may be also preferably from 1 m/s to 3 m/s.

In case that the α, β, γ, and δ in the formula of the recording layer have the following values:

0 atomic %<α≦22 atomic %;

4 atomic %≦β≦18 atomic %;

33 atomic %≦γ≦62 atomic %; and 26 atomic %≦δ≦42 atomic %;

in which 99 atomic %≦α+β+γ+δ≦100 atomic %, the relative speed during the recording and erasing may be preferably from 3 m/s to 5 m/s.

In case that the α, β, γ, and δ in the formula of the recording layer have the following values:

0 atomic %<α≦17 atomic %;

3 atomic %≦β≦17 atomic %;

41 atomic %≦γ≦67 atomic %; and 24 atomic %≦δ≦36 atomic %;

in which 99 atomic %≦α+β+γ+δ≦00 atomic %, the relative speed during the recording and erasing may be preferably from 5 m/s to 7 m/s.

In case that the α, β, γ, and δ in the formula of the recording layer have the following values:

0 atomic %<α≦25 atomic %;

1 atomic %≦β≦17 atomic %;

43 atomic %≦γ≦75 atomic %; and 15 atomic %≦δ≦34 atomic %;

in which 99 atomic %≦α+β+γ+δ≦100 atomic %, the relative speed during the recording and erasing may be preferably from 7 m/s to 20 m/s.

The recording layer of each of the above optical recording mediums may include, in addition to the aforementioned elements Au, In, Sb and Te, a small amount of elements such as Cu, Ag, Ni, Zn, Fe, Ge, Se, S, Sn, Pd, V, As, C, N, and O, as impurities. However, the total amount of such elements is preferably restricted to be equal to or lower than 1% by atomic ratio.

PREFERRED EMBODIMENT

There will be described hereinafter optical recording mediums according lo preferred embodiments of the present invention, with reference to the accompanying drawings.

Figure 1:
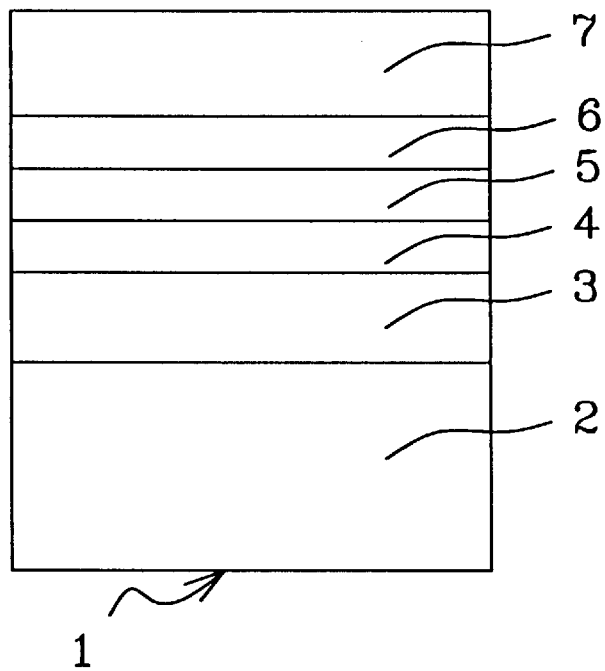
FIG. 1 is a cross-sectional view a layer construction of an optical recording medium according to one embodiment of the present invention.
Figure 2:
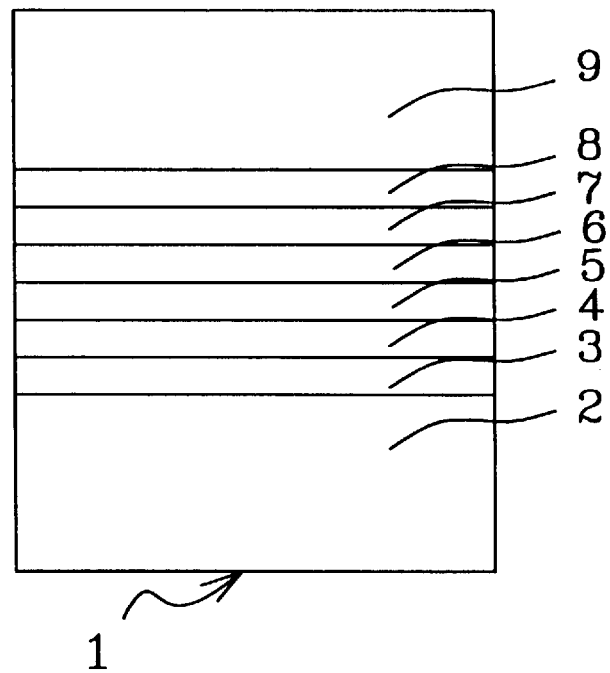
FIG. 2 is a cross-sectional view a layer construction of an optical recording medium according to another embodiment of the present invention.
Figure 3:
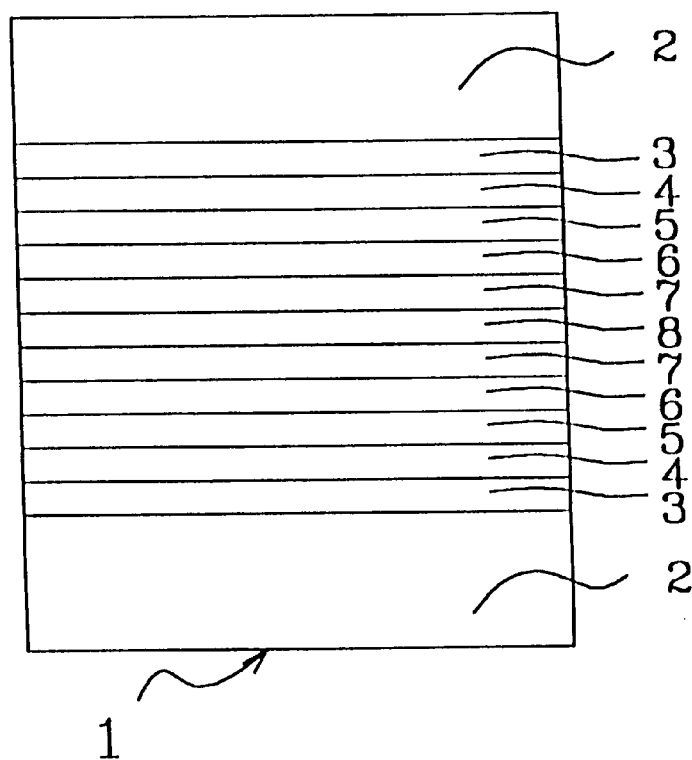
FIG. 3 is a cross-sectional view a layer construction of an optical recording medium according to yet another embodiment of the present invention.

FIGS. 1 through 3 are cross-sectional views showing constitutions of the optical recording mediums according to the present invention.

FIG. 1 shows an optical recording medium 1 of a single-side recording type, having such a structure that a lower dielectric layer 3, a recording layer 4, an upper dielectric layer 5, a reflective layer 6 and a protective layer 7 are laminated in that order on a substrate 2.

FIG. 2 shows an optical recording medium 1 of a single-side recording type, having such a structure that a lower dielectric layer 3, a recording layer 4, an upper dielectric layer 5, a reflective layer 6, a protective layer 7, a bonding layer 8 and ain upper substrate 9 are laminated in that order on a substrate 2, so that the mechanical strength of the medium is improved.

FIG. 3 shows an optical recording medium 1 of a double-side recording type, having such a structure that a lower dielectric layer 3, a recording layer 4, an upper dielectric layer 5, a reflective layer 6, and a protective layer 7 are laminated in that order on each of two substrates 2, and these two groups of layers are bonded to each, other via a bonding layer 8, with the protective layer 7 sides facing to each other.

In the optical recording mediums 1 shown in FIGS. 2 and 3, the protective layers 7 may be omitted.

The substrate 2 is preferably made of a material having transparency to all adopted light beam, such as resin and glass. Resin is particularly preferable from the aspect of ease of handling, and lower cost. Concrete examples of resin include polycarbonate resin, acrylic resin, epoxy resin, ABS resin, and the like. Although the shape and dimension of the substrate are not particularly limited, the substrate is typically a disk-shape, its thickness is typically in the order of from 0.5 mm to 3 mm, and its diameter is typically in the order of from 40 mm to 360 mm. Further, the surface of substrate may be provided with a predetermined pattern such as grooves such as for tracking and/or addressing, as required.

The upper and lower dielectric layers 3 and 5 have functions: to enhance the modulation factor (difference between reflectances in crystal state and amorphous state) by magnifying a change of reflectance by multiple reflection between these layers 3 and 5, which change of reflectance is caused by a change of crystal state of recording layer 4; and to emit the residual heat in the recording layer 4 during recording, at an appropriate speed by thermal conduction.

The dielectric material used for the lower and upper dielectric layers 3 and 5 is preferably inorganic material which is substantially transparent to the adopted light beam. Preferably, the melting point of such inorganic material is higher than that of the material constituting the recording layer 4. Concrete examples of dielectric material include a metallic oxide such as $SiO$, $SiO_2$, $ZnO$, $Al_2O_3$, $TiO_2$, $SnO_2$, $In_2O_3$, $MgO$, $ZrO_2$; a nitride such as $Si_3N_4$, $AlN$, $BN$, $TiN$, $ZrN$; a sulfide such as $ZnS$, $In_2S_3$, $TaS_4$; a carbide such as $SiC$, $TaC$, $WC$, $TiC$, $ZrC$, $B_4C$; or a diamond-type carbon, or ai mixture of these. These materials can be used independently or can be mixed together. Impurities may also be added as required. These upper and lower dielectric layers 3 and 5 may be formed by various types of vapor phase epitaxy methods such as sputtering method, vacuum deposition method, plasma CVD method, optical CV method, electron beam deposition method.

In terms of optical characteristics, by setting the thickness of the lower dielectric layer 3 in the order of from 50 nm to 300 nm, and by setting the thickness of the upper dielectric layer 5 in the order of from 10 nm to 60 nm or from 100 nm to 250 nm, there can be obtained an improved modulation factor in which the effect of multiple reflection of light is effectively utilized.

Meanwhile, from the aspect of heat, when the thickness of the upper dielectric layer 5 is small, the heat insulation effect between the recording layer 4 and reflective layer 6 is reduced so that the heat in the recording layer 4 accumulated during recording is rapidly dispersed to the reflective layer 6 made of metal having a large efficiency of heat emission. Thus, the recording material is required to have a high sensitivity to heating by a laser beam, so as to attain recording and erasing by an optical recording medium including such a thin upper dielectric layer 5 having a thickness in the order of from 10 nm to 60 nm.

In the conventional optical recording mediums which have adopted a chalcogen-type recording material such as Ge—Sb—Te, the recording material does not have a sufficient sensitivity, so that the upper dielectric layer 5 is constructed to have a thickness of from 100 nm to 250 nm. Contrary, Ag—In—Sb—Te and Au—In—Sb—Te type alloys, the latter being the present invention, have high sensitivities to heating by a laser beam, so that the upper dielectric layer 5 can have a reduced thickness of from 10 nm to 60 nm in an optical recording medium adopting such alloys as the recording layer 4. In this constitution, there is an advantage in that the optical recording medium becomes a quench type in which the cooling speed of the recording layer 4 at recording is increased such that the edge of recording pit is sharpened and jitter is reduced. In addition, the film thickness of upper dielectric layer 5 can be made small so that the fabrication time for the layer 5 such as by sputtering is shortened, leading to improvement in productivity.

The recording layer 4 is made of a chalcopyrite type compound consisting of a composition represented by the formula: $Au_\alpha In_\beta Sb_\gamma Te_\delta$ wherein 0 atomic $\%<\alpha\leq 25$ atomic %; 1 atomic $\%\leq\beta\leq 18$ atomic %; 30 atomic $\%\leq\gamma\leq 75$ atomic %; 15 atomic $\%\leq\delta\leq 45$ atomic %; and 99 atomic $\%\leq\alpha+\beta+\gamma+\delta\leq 100$ atomic %. In an optical recording medium having such a recording layer 4, the recording and erasing of information to and from the recording layer is performed at a speed of from 1 m/sec to 20 m/sec of the recording layer relative to a light beam for recording and a light beam for erasing.

Particularly, in case of an optical recording medium which is used at the relative speed of from 1 m/sec to 3 m/sec, the $\alpha, \beta, \gamma,$ and $\delta$ may preferably have the following values: 0 atomic $\%<\alpha\leq 8$ atomic %; 10 atomic $\%\leq\beta\leq 13$ atomic %; 42 atomic $\%\leq\gamma\leq 49$ atomic %; and 34 atomic $\%\leq\delta\leq 41$ atomic %; in which 99 atomic $\%\leq\alpha+\beta+\gamma+\delta\leq 100$ atomic %. Further, the $\alpha, \beta, \gamma,$ and $\delta$ may preferably have the following values: 0 atomic $\%<\alpha\leq 25$ atomic %; 7 atomic $\%\leq\beta\leq 18$ atomic %; and 32 atomic $\%\leq\delta\leq 45$ atomic %, when 30 atomic $\%\leq\gamma\leq 45$ atomic %; 30 atomic $\%\leq\delta\leq 45$ atomic %, when 45 atomic $\%\leq\gamma<49$ atomic %; 35 atomic $\%\leq\delta\leq 45$ atomic %, when 49 atomic $\%\leq\gamma\leq 55$ atomic %; in which 99 atomic $\%\leq\alpha+\beta+\gamma+\delta\leq 100$ atomic %.

In case of an optical recording medium which is used at the relative speed of from 3 m/sec to 5 m/sec, the $\alpha, \beta, \gamma,$ and $\delta$ may advantageously have the following values: 0 atomic $\%<\alpha\leq 22$ atomic %; 4 atomic $\%\leq\beta\leq 18$ atomic %; 33 atomic $\%\leq\gamma\leq 62$ atomic %; and 26 atomic $\%\leq\delta\leq 42$ atomic %; in which 99 atomic $\%\leq\alpha+\beta+\gamma+\delta\leq 100$ atomic %.

In case of an optical recording medium which is used at the relative speed cf from 5 m/sec to 7 m/sec, the $\alpha, \beta, \gamma,$ and $\delta$ may advantageously have thee following values: 0 atomic $\%<\alpha\leq 17$ atomic %; 3 atomic $\%\leq\beta\leq 17$ atomic %; 41 atomic $\%\leq\gamma\leq 67$ atomic %; and 24 atomic $\%\leq\delta\leq 36$ atomic %; in which 99 atomic $\%\leq\alpha+\beta+\gamma+\delta\leq 100$ atomic %. More strictly, it is preferable that the $\alpha, \beta, \gamma,$ and $\delta$ have the following values: 1 atomic $\%\leq\alpha\leq 16$ atomic %, 8 atomic $\%\leq\beta\leq 17$ atomic %, 41 atomic $\%\leq\gamma\leq 63$ atomic %, 24 atomic $\%\leq\delta\leq 36$ atomic %, and in which 99 atomic $\%\leq\alpha+\beta+\gamma+\delta\leq 100$ atomic %; or 0 atomic $\%<\alpha\leq 17$ atomic %, 3 atomic $\%\leq\beta<8$ atomic %, 51 atomic $\%\leq\gamma\leq 67$ atomic %, and 26 atomic $\%\leq\delta\leq 33$ atomic %, in which 99 atomic $\%\leq\alpha+\beta+\gamma+\delta\leq 100$ atomic %. More preferably, the $\alpha, \beta, \gamma,$ and $\delta$ have the following values: 2 atomic $\%\leq\alpha\leq 10$ atomic %, 10 atomic $\%\leq\beta\leq 16$ atomic %, 45 atomic $\%\leq\gamma\leq 59$ atomic %, and 26 atomic $\%\leq\delta\leq 34$ atomic %, in which 99 atomic $\%\leq\alpha+\beta+\gamma+\delta\leq 100$ atomic %; or 1 atomic $\%\leq\alpha\leq 13$ atomic %, 4 atomic $\%\leq\beta<8$ atomic %, 51 atomic $\%\leq\gamma\leq 64$ atomic %, and 27 atomic $\%\leq\delta\leq 30$ atomic %, in which 99 atomic $\%\leq\alpha+\beta+\gamma+\delta\leq 100$ atomic %.

In case of an optical recording medium which is used at the relative speed of from 7 m/sec to 20 m/sec, the $\alpha, \beta, \gamma,$ and $\delta$ may advantageously have the following values: 0 atomic $\%<\alpha\leq 25$ atomic %; 1 atomic $\%\leq\beta\leq 17$ atomic %, 43 atomic $\%\leq\gamma\leq 75$ atomic %; and 15 atomic $\%\leq\delta\leq 34$ atomic %; in which 99 atomic $\%\leq\alpha+\beta+\gamma+\delta\leq 100$ atomic %.

In any of the above compositional ratios, the thickness of the recording layer 4 is not particularly restricted. Nonetheless, it is typically preferable that the layer 4 has a thickness of from 10 nm to 200 nm, particularly from 15 nm to 150 nm, so as to attain high reflectance and high modulation factor (which means that the difference of reflectance between the recorded and unrecorded states is large).

The method for forming the recording layers 4 is not particularly restricted. Nonetheless, it is preferable to form the same by vapor phase epitaxy methods such as sputtering method, vacuum deposition method, plasma CVD method, optical CVD method, electron beam deposition method.

It is expedient to measure the composition of the as-formed recording layer 4, by an X-ray micro-analyzer. Other analyzing methods may be adopted, such as fluorescent X-ray, Rutherford's back scattering, Auger electron spectroscopy and light emission analysis. In adopting the latters, the measured values obtained therefrom are required to be calibrated based on those values obtained by an X-ray micro-analyzer.

For judgment of the crystal state of the material included in the recording layer 4, such as X-ray diffraction or electron beam diffraction is suitable. For example, the material is judged to be in a crystal state when a spot or Debye ring like pattern is observed, and to be in an amorphous state when a ring or halo pattern is observed, both in the electron beam diffraction pattern.

The material of the reflective layer 6 is not particularly restricted, but typically may be constituted of metal having high reflectance such as simple substance of Al, Au, Ag, Pt, Cu or the like, or alloys including one or more of them. The thickness of the reflective layer 6 is preferably from 30 nm to 300 nm, and more preferably, from 30 nm to 150 nm. If the thickness is smaller than such a range, a sufficient reflectance is hardly obtained and there is deteriorated the effect for emitting the residual heat in the recording layer 4 during recording. Further, even if the thickness is larger than such a range, the reflectance and thermal emission effect are not remarkably improved. It is preferable that the reflective layer is formed by a vapor phase epitaxy method such as sputtering method or vapor deposition method.

The protective layer 7 is provided for improving such as scratch crack resistance and corrosion resistance. This protective layer 7 is preferably constituted of any of a variety of organic materials, and particularly preferably, a material which is obtained by hardening a radiation hardening compound or its composition, making use of radiation such as electron beam or ultraviolet rays. The thickness of the protective layer 7 is typically from 0.1 $\mu$m to 100 $\mu$m, and may be formed by a typical method such as spin-coating, gravure coating, spray coating.

The bonding layer 8 is preferably constituted of any of a variety of organic materials, and particularly preferably, a material which is obtained by hardening a thermoplastic material, adhesive material, radiation hardening compound, or composition thereof, by means of electron beam or radiation. The thickness of the bonding layer 8 is in the order of from 0.1 $\mu$m to 100 $\mu$m, and may be formed by the most appropriate method for the adopted material for the layer 8, such as spin-coating, gravure coating, spray coating, or roll coating.

The upper substrate 9 may be constituted of the material same with that of the aforementioned substrate 2.

Generally, the recording layer 4 is in an amorphous state at the fabrication of phase-change type optical recording medium. It is therefore necessary to crystallize (i.e., initialize) the recording layer 4 anyhow, so as to prepare an overwriteable optical recording medium. As an initializing method for optical recording medium 1, there can be used a variety of methods such as semiconductor laser method, Ar laser method, and flash lamp method. Particularly, the method, in which the initialization is performed by means of semiconductor laser of high power, is superior: in uniformity after initialization of film which forms the recording layer 4; in signal characteristics of optical recording medium 1; and in productivity. The beam diameter size suitably has width of from 0.5 $\mu$m to 5 $\mu$m, and length of from 10 $\mu$m to 300 $\mu$m. The power and the line speed are suitably in the ranges of from 100 mW to 3,000 mW, and from 1 m/sec to 20 m/sec, respectively.

In the optical recording medium 1 of the embodiment according to the present invention, the recording and reproduction are performed as follows.

The recording layer 4 of the optical recording medium 1 is wholly crystallized when it is in the initialized state. If a light beam for recording (laser light beam) is irradiated to the crystallized recording layer 4, the irradiated part of layer 4 is melted by the energy of the light beam. Further, the temperature at the melted part falls suddenly after the recording light beam has passed therefrom, so that this part is amorphized to become a signal recorded part.

In case of overwriting the recorded information, the recording light beam is irradiated to the recorded part which is to be newly written with a signal or information and a light beam for erasing is irradiated to the other part of layer 4. At that time, the power of the erasing light beam is adjusted to be weaker than that of the recording light beam, such that the part of recording layer 4 irradiated with the erasing light beam is heated to a temperature which is equal to or higher than the crystallization temperature (or glass transition temperature) and equal to or lower than the melting point.

The part irradiated with the recording light beam is: melted no matter whether it has been crystal or amorphous before irradiation; and amorphized due to quenching after passing of the beam. Contrary, the part irradiated with the erasing light beam is: not changed if it has been crystal; or crystallized if it has been amorphous, since the part is heated to a temperature equal to or higher than the crystallization temperature (and equal to or lower than the melting point). As such, upon overwriting, no matter whether the state before irradiation is crystalline or amorphous, those parts of recording layer 4, which are irradiated with the recording light beam, wholly become, the signal recorded parts of amorphous state, and those parts, which are irradiated with the erasing light beam, wholly become the crystal. Thus, the overwriting recording is made possible.

Figure 4:
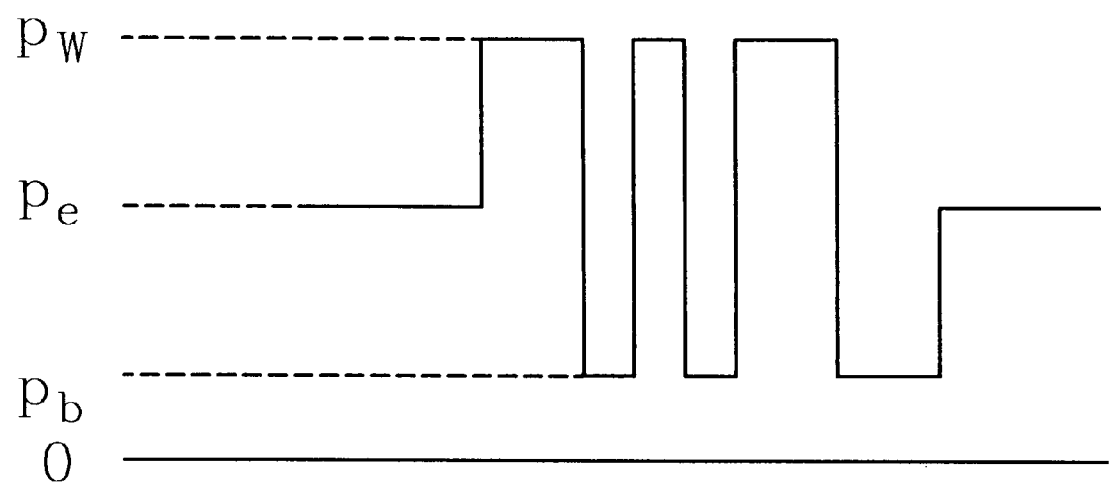
FIG. 4 is a graph showing an example of pulse shape at the time oil overwriting.

The recording light beam and erasing light beam can be provided by a single light source, by modulating the intensity of the single light beam therefrom. The recording light beam Pw is preferably irradiated in a multi-pulse shape, as shown ion FIG. 4. Namely, one signal is recorded by irradiation of pulsed light beam at at least two times, so that the heat accumulation at the recorded part is restricted to thereby restrain the expansion of the trailing end of the recorded part (tear-drop phenomenon), so that the C/N and jitter are improved. The concrete values of the power Pw of recording light beam and the power Pe of erasing light beam can be experimentally determined, correspondingly to the wavelength of light beam to be used. In FIG. 4, Pb represents a bottom power.

The reproduction light beam has such a low power that the recording layer 4 is not heated to a temperature equal to or above its crystallization temperature so that the crystal state and amorphous state of layer 4 are not affected. The power of reproduction light beam can be determined correspondingly to the wavelength of light beam to be used.

EMBODIMENTS

The present invention will now be explained in detail with reference to concrete embodiments of the recording medium according to the present invention, which embodiments are given for illustration of the invention and are not intended to be limiting thereof.

There will be hereinafter explained concrete embodiments 1 and 2 of optical recording mediums, which are particularly preferable when used at the relative speed of recording layer of from 1 m/s to 3 m/s relative to the recording light beam and erasing light beam.

Firstly, there will be described the concrete embodiment 1 of the optical recording medium which has a recording layer consisting of a composition represented by the formula: $Au_\alpha In_\beta Sb_\gamma Te_\delta$ wherein 0 atomic %<$\alpha \leq 8$ atomic %; 10 atomic %$\leq \beta \leq 18$ atomic %; 42 atomic %$\leq \gamma \leq 49$ atomic %; 34 atomic %$\leq \delta \leq 41$ atomic %; and 99 atomic %$\leq \alpha + \beta + \gamma + \delta \leq 100$ atomic %.

There was provided an optical recording medium 1 having the constitution of FIG. 1, by forming, on a grooved polycarbonate substrate 2 having a diameter of 120 mm and a thickness of 1.2 mm, a lower dielectric layer 3, a recording layer 4, an upper dielectric layer 5, a reflective layer 6 and a protective layer 7. The groove of substrate 2 was constituted to have a track pitch of 1.6 $\mu$m, width of 0.5 $\mu$m, and depth of 50 nm.

The lower dielectric layer 3 was fabricated by RF sputtering method, adopting ZnS—SiO$_2$ (SiO$_2$: 20 mol %) as a target. The thickness of lower dielectric layer 3 was made to be 180 nm.

The recording layer 4 was fabricated by DC sputtering method, by disposing each chips of Au, In, Sb and Te on an In—Sb—Te target while varying the compositions. The thickness of recording layer 4 was made to be 20 nm.

The composition of recording layer 4 was measured by an X-ray microanalyzer making use of an EDAX device system of Philips Co. Ltd. Namely, after fabricating the recording layer 4 having a thickness of about 50 nm onto a polycarbonate flat plate by the sputtering method, the energy spectrum of the sample was detected by the X-ray microanalyzer. The background such as of the polycarbonate flat plate was excluded from the detected energy spectrum, to derive the energy spectrum of the recording layer 4 only. The quantification of the constituent elements of recording layer 4 was performed from this energy spectrum, so that the composition of layer 4 was determined.

The upper dielectric layer 5 was fabricated similarly to the lower dielectric layer 3. The thickness of lower dielectric layer 5 was made to be 20 nm.

The reflective layer 6 was fabricated by DC sputtering method, using Al or Ag as a target. The thickness was made to be 100 nm for Al, or 70 nm for Ag.

The protective layer 7 was fabricated by applying an ultraviolet hardening resin by spin coating method, and thereafter hardening it with ultraviolet radiation The thickness of protective layer 7 after hardening was 10 μm.

The recording layer 4 after fabrication of optical recording medium 1 was in an amorphous state. As such, the recording layer 4 was sufficiently crystallized to obtain an initial state, by high power semiconductor laser beam having a wavelength of 810 nm.

Evaluation of optical recording medium 1 was carried out by irradiating a 780 nm semiconductor laser through an objective lens with an NA (numerical aperture) of 0.5 onto the surface of the recording layer 4 from the substrate 2 side beam to thereto apply about 1 μm diameter spot. At the time of recording, the recording was carried out by irradiating the laser pulse in a multi-pulse shape.

As the disk characteristics, the C/N, erase ratio, modulation factor and the life span of recording/erasing repeatability were measured by the following procedure.

Namely, the C/N was measured by firstly recording a signal of recording frequency of 1.44 MHz (3T of EFM modulation method) at a line speed of 2.8 m/sec, and thereafter measuring the C/N of the reproduction signal when reproduced at a line speed of 1.4 m/sec.

The erase ratio was obtained from the difference (C2–C1) between the carrier levels each at a line speed of 1.4 m/sec and at a frequency of 0.72 MHz, when a signal of recording frequency of 0.40 MHz (11T of EFM modulation method) was overwritten onto a signal of recording frequency of 1.44 MHz (3T of EFM modulation method) which had been recorded at a line speed of 2.8 m/sec. Cl is a carrier level at a line speed of 1.4 m/sec and at a frequency of 0.72 MHz after 3T recording, and C2 is a residual carrier level at a line speed of 1.4 m/sec and at a frequency of 0.72 MHz after 11T overwriting.

The modulation factor was measured from the difference {(R1–R2)/R1} between the reflectance levels of unrecorded portion and recorded portion which were obtained from the reproduction signal, when a signal of recording frequency of 0.40 MHz (11T of EFM modulation method) had been recorded at a line speed of 2.8 m/sec. R1 and R2 are reproduction signal levels of unrecorded and recorded portions, respectively.

The recording/erasing repeatability characteristics was evaluated by repeatedly overwriting a random signal with EFM modulation method at a line speed of 2.8 m/sec, reproducing at a line speed of 1.4 m/sec at each of 500 times of overwriting, and measuring jitter of the 3T signal. The number of times where the jitter exceeded 35 ns was regarded as the life span of recording/erasing repeatability.

Embodiment 1-1

There was fabricated an optical recording medium having a laminated construction comprising polycarbonate substrate (1.2 mm)/ZnS—SiO$_2$ (180 nm)/Au—In—Sb—Te (20 nm)/ZnS—SiO$_2$ (20 nm)/Al (100 nm)/ultraviolet hardening resin (10 μm), in which the composition of recording layer 4 was Au: 3.6, In: 12.4, Sb: 47.2, and Te:36.8

The evaluation as an optical recording medium was carried out by the aforementioned procedures, under the condition of erasing power of 6 mW, multi-pulse bottom power of 1 mW, and reproduction power of 1 mW, while varying the recording power. The result is shown in Table 1.

TABLE 1

| Recording Power | mW | 7 | 8 | 9 | 10 | 11 | 12 | 13 |
|---|---|---|---|---|---|---|---|---|
| C/N | dB | 14.6 | 35.6 | 46.6 | 50.3 | 51.2 | 52.2 | 51.9 |
| Erase Ratio | dB | −1.8 | −13.1 | −20.7 | −37.7 | −34.5 | −34.6 | −34.6 |
| Modulation Factor | | 0 | 0.20 | 0.40 | 0.50 | 0.54 | 0.56 | 0.59 |

There were obtained sufficient C/N, erase ratio, modulation factor, even with a relatively low recording power.

Embodiment 1-2

There was fabricated an optical recording medium having a laminated construction comprising polycarbonate substrate (1.2 mm)/ZnS—SiO$_2$ (180 nm)/Au—In—Sb—Te (20 nm)/ZnS—SiO$_2$ (20 nm)/Ag (70 nm)/ultraviolet hardening resin (10 μm), in which the composition of recording layer 4 was Au: 3.6, In: 12.4, Sb: 47.2, and Te:36.8

The evaluation as an optical recording medium was carried out by the aforementioned procedures, under the condition of erasing power of 6 mW, multi-pulse bottom power of 1 mW, and reproduction power of 1 mW, while varying the recording power. The result is shown in Table 2.

TABLE 2

| Recording Power | mW | 6 | 7 | 8 | 9 | 10 | 11 | 12 | 13 |
|---|---|---|---|---|---|---|---|---|---|
| C/N | dB | 34.4 | 50.0 | 53.7 | 55.3 | 56.7 | 56.8 | 57.5 | 57.3 |
| Erase Ratio | dB | −9.0 | −25.6 | −33.2 | −43.3 | −40.5 | −38.5 | −38.4 | −36.8 |
| Modulation Factor | | 0.10 | 0.36 | 0.53 | 0.59 | 0.64 | 0.66 | 0.67 | 0.68 |

There were obtained sufficient C/N, erase ratio, modulation factor, even with a relatively low recording power.

Embodiments 1-3 to 1-10, and Comparative Examples 1-1 to 1-10

There were fabricated optical recording mediums having a laminated construction comprising polycarbonate substrate (1.2 mm)/ZnS—SiO$_2$ (180 nm)/Au—In—Sb—Te (20 nm)/ZnS—SiO$_2$ (20 nm)/Al (100 nm)/ultraviolet hardening resin (10 μm), in which the compositions of recording layer 4 were varied. Further, the evaluation as optical recording mediums was carried out by the aforementioned procedures.

There were used a recording power of 12 mW, erasing power of 6 mW, multi-pulse bottom power of 1 mW, and reproduction power of 1 mW. As disk characteristics, the C/N and recording/erasing repeatability characteristics are shown in Table 3. About the recording/erasing repeatability characteristics, the number of overwriting times, up to a time when the jitter exceeded 35 ns based on the aforementioned experiment or evaluation method, are shown by a certain range such as by "1,000 to 10,000". This means that the characteristics may vary within the indicated range, such as depending on the fabrication condition and evaluation condition.

erasing repeatability characteristics were evaluated under the same condition for the aforementioned embodiments 1-3 to 1-10.

Comparative Examples 1-11 to 1-13

There were fabricated three optical recording mediums each having a laminated construction same with the embodiments 1-3 to 1-10, except that the recording layers 4 of them consisted of Ag—In—Sb—Te, Ag—In—Sb—Te—V, and Cu—In—Sb—Te, respectively, which were fabricated by disposing appropriate chip(s) of Ag, V and Cu on an In—Sb—Te target and then using DC sputtering. Further, the C/N and recording/erasing repeatability characteristics were evaluated under the same condition for the aforementioned embodiments 1-3 to 1-10.

The evaluation results of the embodiments 1-11 and the comparative examples 1-11 to 1-13 are shown in Table 4.

TABLE 3

| | Composition of Recording Layer (atomic %) | | | | Disk Characteristics | |
| --- | --- | --- | --- | --- | --- | --- |
| | | | | | | Recording/Erasing Repeatability Characteristics |
| | Au | In | Sb | Te | C/N (dB) | (Number of Times) |
| Embodiment 1-3 | 0.6 | 12.2 | 48.5 | 38.7 | 53.8 | 1,000 to 10,000 |
| Embodiment 1-4 | 2.9 | 12.3 | 46.4 | 38.4 | 52.0 | 1,000 to 10,000 |
| Embodiment 1-5 | 3.3 | 12.4 | 48.6 | 35.7 | 51.0 | 1,000 to 10,000 |
| Embodiment 1-6 | 3.6 | 12.4 | 47.2 | 36.8 | 50.8 | >10,000 |
| Embodiment 1-7 | 3.8 | 13.3 | 45.2 | 37.7 | 52.0 | >10,000 |
| Embodiment 1-8 | 4.6 | 12.2 | 47.9 | 35.3 | 47.0 | 1,000 to 10,000 |
| Embodiment 1-9 | 5.1 | 11.8 | 43.7 | 39.4 | 53.2 | >10,000 |
| Embodiment 1-10 | 5.7 | 12.3 | 47.1 | 34.9 | 50.5 | 1,000 to 10,000 |
| Comparative Example 1-1 | 0 | 12.8 | 49.4 | 37.8 | 52.8 | 100 to 1,000 |
| Comparative Example 1-2 | 0.9 | 12.2 | 41.8 | 45.1 | 20.0 | 0 |
| Comparative Example 1-3 | 1.9 | 8.0 | 34.2 | 55.9 | 22.9 | 0 |
| Comparative Example 1-4 | 2.3 | 4.2 | 18.7 | 74.8 | 27.0 | 0 |
| Comparative Example 1-5 | 2.6 | 9.9 | 56.5 | 31.0 | 40.3 | 0 |
| Comparative Example 1-6 | 3.8 | 12.0 | 49.4 | 34.8 | 34.4 | <10 |
| Comparative Example 1-7 | 4.0 | 11.9 | 49.3 | 34.8 | 33.8 | 0 |
| Comparative Example 1-8 | 7.1 | 40.0 | 41.5 | 11.4 | 33.8 | 0 |
| Comparative Example 1-9 | 6.7 | 6.9 | 31.5 | 54.9 | 28.4 | 0 |
| Comparative Example 1-10 | 12.1 | 11.8 | 44.3 | 31.8 | 18.7 | 0 |

From this Table 3, it can be easily seen that: the optical recording mediums of the Embodiments 1-3 to 1-10 each of which has a recording layer consisting of a composition within such ranges that the compositional ratio α of Au is 0 atomic %<α≦8 atomic %, the compositional ratio β of In is 10 atomic %≦β≦18 atomic %, the compositional ratio γ of Sb is 42 atomic %≦γ≦49 atomic %, and the compositional ratio δ of Te is 34 atomic %≦δ≦41 atomic % (in which 99 atomic %≦α+β+γ+δ≦100 atomic %); show superior disk characteristics, as compared to those of the comparative examples 1-1 to 1-10 each of which has a recording layer consisting of a composition outside such ranges.

Particularly, the optical recording mediums of embodiments 1-6, 1-7 and 1-9, each of which has a recording layer consisting of a composition within such ranges that 3 atomic %≦α≦6 atomic %, 11 atomic %≦β≦14 atomic %, 43 atomic %≦γ≦48 atomic %, 36 atomic %≦δ≦40 atomic % (in which 99 atomic %≦α+β+γ+δ≦100 atomic %), have superior characteristics.

There were additionally conducted the following experiments, for comparison with recording layers having different elements.

Embodiment 1-11

About the optical recording medium having a constitution identical with the -embodiment 1-2, the C/N and recording/

TABLE 4

| | Composition of Recording Layer (atomic %) | C/N (dB) | Recording/Erasing Repeatability Characteristics (Number of Times) |
| --- | --- | --- | --- |
| Embodiment 1-11 | Au:3.6, In:12.4, Sb:47.2, Te:36.8 | 57.5 | >10,000 |
| Comparative Example 1-11 | Ag:9.1, In:12.1, Sb:46.6, Te:32.2 | 53.5 | 1,000 to 2,000 |
| Comparative Example 1-12 | Ag:9.0, In:12.3, Sb:46.2, Te:32.1, V:0.4 | 53.2 | 100 to 1,000 |
| Comparative example 1-13 | Cu:8.7, In:12.2, Sb:46.6, Te:32.5 | 52.1 | 100 to 1,000 |

The embodiment 1-11 provides a recording/erasing repeated times of more than 10,000 times to thereby exhibit disk characteristics superior to the comparative examples 1-11 to 1-13 each of which ha s a recording layer of a composition including different element(s).

There will be now described hereinafter the concrete embodiment 2 of the optical recording medium which has such a recording layer that the α, β, γ, and δ have the following values: for α and β, 0 atomic %<α≦25 atomic %, 7 atomic %≦β≦18 atomic %; and, for γ and δ, 32 atomic % ≦ δ ≦ 45 atomic % when 30 atomic % ≦ γ < 45 atomic %, 30 atomic % ≦ δ ≦ 45 atomic % when 45 atomic % ≦ γ < 49 atomic %, 35 atomic % ≦ δ ≦ 45 atomic % when 49 atomic % ≦ γ ≦ 55 atomic % (in which 99 atomic % ≦ α+β+γ+δ ≦ 100 atomic %).

There was provided an optical recording medium 1 having the constitution of FIG. 1, by forming, on a grooved polycarbonate substrate 2 identical with that used in the embodiment 1, a lower dielectric layer 3, a recording layer 4, an upper dielectric layer 5, a reflective layer 6 and a protective layer 7. Only, the thickness of lower dielectric layer 3 was made to be 200 nm. The reflective layer 6 was similarly fabricated, using Al only as a target. The thickness of the reflective layer was made to be 100 nm.

The composition measurement and initialization for the recording layer 4, as well as the evaluation of optical recording medium 1 were performed in the same manner with the embodiment 1.

As the disk characteristics, C/N, erase ratio, modulation factor and life span of recording/erasing repeatability were measured by the following procedure.

Namely, the C/N was measured by firstly recording a signal of recording frequency of 1.44 MHz (3T of EFM modulation method) at a line speed of 2.4 m/sec, and thereafter measuring the C/N of the reproduction signal when reproduced at a line speed of 1.2 m/sec.

The erase ratio was obtained from the difference (C2−C1) between the carrier levels each at a line speed of 1.2 m/sec and at a frequency of 0.72 MHz, when a signal of recording frequency of 0.40 MHz (11T of EFM modulation method) was overwritten onto a signal of recording frequency of 1.44 MHz (3T of EFM modulation method) which had been recorded at a line speed of 2.4 m/sec. C1 is a carrier level at a line speed of 1.2 m/sec and at a frequency of 0.72 MHz after 3T recording, and C2 is a residual carrier level at a line speed of 1.2 m/sec and at a frequency of 0.72 MHz after 11T overwriting.

The modulation factor was measured from the difference {(R1−R2)/R1} between the reflectance levels of unrecorded portion and recorded portion which were obtained from the reproduction signal, when a signal of recording frequency of 0.40 MHz (11T of EFM modulation method) had been recorded at a line speed of 2.4 nm/sec. R1 and R2 are reproduction signal levels of unrecorded and recorded portions, respectively.

The recording/erasing repeatability characteristics was evaluated by repeatedly overwriting a random signal with EFM modulation method at a line speed of 2.4 m/sec, reproducing at a line speed of 1.2 m/sec at each of 500 times of overwriting, and measuring jitter of the 3T signal. The number of times where the jitter exceeded 35 ns was regarded as the life span of recording/erasing repeatability.

Embodiment 2-1

There was fabricated an optical recording medium having a laminated construction comprising polycarbonate substrate (1.2 mm)/ZnS—SiO$_2$ (200 nm)/Au—In—Sb—Te (20 nm)/ZnS—SiO$_2$ (20 nm)/Al (100 nm)/ultraviolet hardening resin (10 μm), in which the composition of recording layer 4 was Au: 3.9, In: 11.5, Sb: 46.8, and Te:37.8

The evaluation as an optical recording medium was carried out by the aforementioned procedures, under the condition of erasing power of 6 mW, multi-pulse bottom power of 1 mW, and reproduction power of 1 mW, while varying the recording power. The result is shown in Table 5.

TABLE 5

| Recording Power | mW | 9 | 10 | 11 | 12 | 13 |
|---|---|---|---|---|---|---|
| C/N | dB | 31.1 | 48.0 | 50.7 | 51.7 | 53.3 |
| Erase Ratio | dB | −15.0 | −17.8 | −31.8 | −34.8 | −34.1 |
| Modulation Factor | | 0.24 | 0.42 | 0.48 | 0.53 | 0.55 |

There were obtained sufficient C/N, erase ratio, modulation factor, even with a relatively low recording power.

Embodiments 2-2 to 2-14, and Comparative Examples 2-1 to 2-7

There were fabricated optical recording mediums having a laminated construction comprising polycarbonate substrate (1.2 mm)/ZnS—SiO$_2$ (200 nm)/Au—In—Sb—Te (20 nm)/ZnS—SiO$_2$ (20 nm)/Al (100 nm) ultraviolet hardening resin (10 μm), in which the compositions of recording layer 4 were varied. Further, the evaluation as optical recording mediums were carried out by the aforementioned procedures.

There were used a recording power of 12 mW, erasing power of 6 mW, multi-pulse bottom power of 1 mW, and reproduction power of 1 mW. As disk characteristics, the C/N and recording/erasing repeatability characteristics are shown in Table 6. As to the recording/erasing repeatability characteristics, the number of overwriting times, up to a time when the jitter exceeded 35 ns based on the aforementioned experiment or evaluation method, are shown by a certain range such as by "1,000 to 10,000".

TABLE 6

| | Composition of Recording Layer (atomic %) | | | | Disk Characteristics | |
|---|---|---|---|---|---|---|
| | Au | In | Sb | Te | C/N (dB) | Recording/Erasing Repeatability Characteristics (Number of Times) |
| Embodiment 2-2 | 0.6 | 12.2 | 48.5 | 38.7 | 52.1 | 1,000 to 10,000 |
| Embodiment 2-3 | 1.2 | 8.6 | 54.2 | 36.0 | 50.3 | 1,000 to 10,000 |
| Embodiment 2-4 | 1.9 | 10.4 | 52.3 | 35.4 | 48.4 | 1,000 to 10,000 |
| Embodiment 2-5 | 3.6 | 12.4 | 47.2 | 36.8 | 49.3 | >10,000 |
| Embodiment 2-6 | 3.7 | 13.5 | 40.5 | 42.3 | 47.7 | 1,000 to 10,000 |
| Embodiment 2-7 | 3.8 | 13.3 | 45.2 | 37.7 | 51.7 | >10,000 |
| Embodiment 2-8 | 3.9 | 11.5 | 46.8 | 37.8 | 52.9 | >10,000 |
| Embodiment 2-9 | 3.9 | 12.5 | 43.5 | 40.1 | 52.0 | >10,000 |

TABLE 6-continued

|  | Composition of Recording Layer (atomic %) | | | | Disk Characteristics | |
|---|---|---|---|---|---|---|
|  | | | | | | Recording/Erasing Repeatability Characteristics |
|  | Au | In | Sb | Te | C/N (dB) | (Number of Times) |
| Embodiment 2-10 | 5.1 | 11.8 | 43.7 | 39.4 | 49.8 | >10,000 |
| Embodiment 2-11 | 11.4 | 9.6 | 48.2 | 30.8 | 45.9 | 1,000 to 10,000 |
| Embodiment 2-12 | 11.6 | 7.8 | 47.4 | 33.2 | 43.1 | 1,000 to 10,000 |
| Embodiment 2-13 | 13.2 | 11.7 | 37.1 | 38.0 | 49.9 | >10,000 |
| Embodiment 2-14 | 20.4 | 10.9 | 33.2 | 35.5 | 46.4 | 1,000 to 10,000 |
| Comparative Example 2-1 | 1.0 | 7.9 | 55.4 | 35.7 | 47.4 | 0 |
| Comparative Example 2-2 | 2.1 | 12.3 | 39.9 | 45.7 | 43.5 | 0 |
| Comparative Example 2-3 | 5.3 | 18.6 | 44.5 | 31.6 | 37.7 | 0 |
| Comparative Example 2-4 | 9.8 | 17.0 | 43.3 | 29.9 | 39.4 | 0 |
| Comparative Example 2-5 | 16.3 | 6.9 | 45.1 | 31.7 | 36.5 | 0 |
| Comparative Example 2-6 | 18.6 | 11.5 | 29.2 | 40.7 | 35.7 | 0 |
| Comparative Example 2-7 | 25.5 | 8.3 | 33.0 | 33.2 | 34.9 | 0 |

From this Table 6, it can be easily seen that: the optical recording mediums of the Embodiments 2-2 to 2-14 each of which has a recording layer consisting of a composition within such ranges that the compositional ratio $\alpha$ of Au is 0 atomic $\% < \alpha \leq 25$ atomic %, the compositional ratio $\beta$ of In is 7 atomic $\% \leq \beta \leq 18$ atomic %, the compositional ratios $\gamma$ and $\delta$ of Sb and Te, respectively are 32 atomic $\% \leq \delta \leq 45$ atomic % when 30 atomic $\% \leq \gamma < 45$ atomic %, 30 atomic $\% \leq \delta \leq 45$ atomic % when 45 atomic $\% \leq \gamma < 49$ atomic %, and 35 atomic $\% \leq \delta \leq 45$ atomic % when 49 atomic $\% \leq \gamma \leq 55$ atomic % (in which 99 atomic $\% \leq \alpha+\beta+\gamma+\delta \leq 100$ atomic %); show superior disk characteristics, as compared to those of the comparative examples 2-1 to 2-7 each of which has a recording layer consisting of a composition outside such ranges.

Particularly, the optical recording mediums of embodiments 2-5, 2-7 through 2-10, and 2-13, each of which has a recording layer consisting of a composition within such ranges that 3 atomic $\% \leq \alpha \leq 14$ atomic %, 11 atomic $\% \leq \beta \leq 14$ atomic %, 37 atomic $\% \leq \gamma \leq 48$ atomic %, and 36 atomic $\% \leq \delta \leq 41$ atomic % (in which 99 atomic $\% \leq \alpha+\beta+\gamma+\delta \leq 100$ atomic %), have superior characteristics.

There were additionally conducted the following experiments, for comparison with recording layers having different elements.

Comparative Example 2-8

There was fabricated an optical recording medium having a laminated construction same with the embodiments 2-2 to 2-14, except that its recording layer 4 consisted of Ag—In—Sb—Te which was fabricated by disposing a chip of Ag on an In—Sb—Te target and then using DC sputtering. Further, the C/N and recording/erasing repeatability characteristics were evaluated under the same condition for the aforementioned embodiments 2-2 to 2-14. The evaluation result is shown in Table 7.

TABLE 7

|  | Composition of Recording Layer (atomic %) | | | | Disk Characteristics | |
|---|---|---|---|---|---|---|
|  | | | | | C/N | Recording/Erasing Repeatability Characteristics |
|  | Ag | In | Sb | Te | (dB) | (Number of Times) |
| Comparative Example 2-8 | 9.1 | 12.1 | 46.6 | 32.2 | 52.6 | 1,000 to 2,000 |

The embodiments 2-2 through 2-14 provide a recording/erasing repeated times of from 1,000 to more than 10,000 times to thereby exhibit disk characteristics superior to the comparative example 2-8 which has a recording layer of a composition including a different element.

There will be now described hereinafter a concrete embodiment 3 of the optical recording medium according to the present invention: which is particularly preferable when used at the relative speed of from 5 m/sec to 7 m/sec of the recording layer relative to the recording light beam and erasing light beam: namely, the $\alpha$, $\beta$, $\gamma$, and $\delta$ have the following values; 0 atomic $\% < \alpha \leq 17$ atomic %, 3 atomic $\% \leq \beta \leq 17$ atomic %, 41 atomic $\% \leq \gamma \leq 67$ atomic %, and 24 atomic $\% \leq \delta \leq 36$ atomic % (in which 99 atomic $\% \leq \alpha+\beta+\gamma+\delta \leq 100$ atomic %).

There was provided an optical recording medium 1 having the constitution of FIG. 3: by laminating onto each of two landed/grooved polycarbonate substrates 2 having a diameter of 120 mm and a thickness of 0.6 mm, a lower dielectric layer 3, a recording layer 4, an upper dielectric layer 5, a reflective layer 6 and a protective layer 7 in that order; and by bonding these two optical recording mediums or layers to each other via a bonding layer 8, with the protective layer 7 sides facing to each other. The land/groove of the substrate 2 was constituted to have a track pitch of 0.74 μm and a depth of 70 nm.

The lower dielectric layer 3, recording layer 4, upper dielectric layer 5, reflective layer 6 and protective layer 7 were formed in a manner same with the embodiment 2. Only, the thicknesses of the lower dielectric layer 3, recording layer 4, and upper dielectric layer 5 were 140 nm, 22 nm, and 25 nm, respectively.

The bonding layer 8 was formed by applying an ultraviolet hardening resin by screen coating method, and thereafter hardening it with ultraviolet radiation. The thickness of bonding layer 8 after hardening was from 30 μm to 50 μm.

The composition measurement and initialization for the recording layer 4 were performed in the same manner with the embodiment 1.

Evaluation of recording layer 4 was carried out by irradiating a 635 nm semiconductor laser beam through an objective lens with an NA (numerical aperture) of 0.6 onto the surface of the recording layer 4 from the substrate 2 side to thereby apply about 1 µm diameter spot. At the time of recording, the recording was carried out by irradiating the laser pulse in a multi-pulse shape.

As the disk characteristics, C/N, erase ratio, modulation factor and life span of recording/erasing repeatability were measured by the following procedure.

Namely, the C/N was measured by firstly recording a signal of recording frequency of 4.86 MHz (3T of 8/16 modulation method) at a line speed of 6.0 m/sec, and thereafter measuring the C/N of the reproduction signal when reproduced at a line speed of 6.0 m/sec.

The erase ratio was obtained from the difference (C2−C1) between the carrier levels each at a line speed of 6.0 m/sec and at a frequency of 4.86 MHz, when a signal of recording frequency of 1.32 MHz (11T of 8/16 modulation method) was overwritten onto a signal of recording frequency of 4.86 MHz (3T of 8/16 modulation L method) which had been recorded at a line speed of 6.0 m/sec. C1 is a carrier level at ia line speed of 6.0 m/sec and at a frequency of 4.86 MHz after 3T recording, and C2 is a residual carrier level at a line speed of 6.0 m/sec and at a frequency of 4.86 MHz after 11T overwriting.

The modulation factor was measured from the difference {(R1−R2)/R1} between the reflectance levels of unrecorded portion and recorded portion which were obtained from the reproduction signal, when a signal of recording frequency of 1.32 MHz (11T of 8/16 modulation method) had been recorded at a line speed of 6.0 m/sec. R1 and R2 are reproduction signal levels of unrecorded and recorded portions, respectively.

The recording/erasing repeatability characteristics was evaluated by repeatedly overwriting a random signal with 8/16 modulation method at a line speed of 6.0 m/sec, reproducing at a line speed of 6.0 m/sec at each of 500 times of overwriting, and measuring jitter of the random signal. The number of times where the jitter exceeded 15% of the reference clock (29.18 MHz) was regarded as the life span of recording/erasing repeatability.

Embodiment 3-1

There was fabricated an optical recording medium 1: by laminating, onto each of two sheets of polycarbonate substrates (0.6 mm), ZnS—SiO$_2$ (140 nm)/Au—In—Sb—Te (22 nm)/ZnS—SiO$_2$ (25 nm)/Al (100 nm)/ultraviolet hardening resin (10 µm), in that order; and by bonding these two optical recording mediums or layers to each other via bonding layer 8, with the protective layer 7 sides facing to each other; in which the composition of recording layer 4 was Au: 9.6, In: 11.4, Sb: 45.2, and Te:33.8.

The evaluation as an optical recording medium was carried out by the aforementioned procedures, under the condition of erasing power of 6 mW, multi-pulse bottom power of 1 mW, and reproduction power of 1 mW, while varying the recording power. The result is shown in Table 8.

TABLE 8

| Recording Power | mW | 6 | 7 | 8 | 9 | 10 | 11 | 12 |
|---|---|---|---|---|---|---|---|---|
| C/N | dB | 45.8 | 48.8 | 50.4 | 51.2 | 51.4 | 52.0 | 51.6 |
| Erase Ratio | dB | −27.9 | −25.9 | −29.6 | −31.5 | −32.4 | −32.4 | −32.7 |
| Modulation Factor | | 0.26 | 0.33 | 0.44 | 0.50 | 0.55 | 0.57 | 0.60 |

There were obtained sufficient C/N, erase ratio, modulation factor, even with a relatively low recording power.

Embodiment 3-2

There was fabricated an optical recording medium 1: by laminating, onto each of two sheets of polycarbonate substrates (0.6 mm), ZnS—SiO$_2$ (140 nm)/Au—In—Sb—Te (22 nm)/ZnS—SiO$_2$ (25 nm)/Al (100 nm)/ultraviolet hardening resin (10 µm), in that order; and by bonding these two optical recording mediums to each other via bonding layer 8, with the protective layer 7 sides facing to each other; in which the composition of recording layer 4 was Au: 4.6, In: 10.4, Sb: 55.6, and Te:29.4.

The evaluation as an optical recording medium was carried out by the aforementioned procedures, under the condition of erasing power of 6 mW, multi-pulse bottom power of 1 mW, and reproduction power of 1 mW, while varying the recording power. The result is shown in Table 9.

TABLE 9

| Recording Power | mW | 8 | 9 | 10 | 11 | 12 |
|---|---|---|---|---|---|---|
| C/N | dB | 48.4 | 51.8 | 53.2 | 54.0 | 53.8 |
| Erase Ratio | dB | −30.9 | −24.8 | −30.3 | −33.6 | −34.6 |
| Modulation Factor | | 0.18 | 0.29 | 0.39 | 0.45 | 0.49 |

There were obtained sufficient C/N, erase ratio, modulation factor, even with a relatively low recording power.

Embodiment 3-3

There was fabricated an optical recording medium 1: by laminating, onto each of two sheets of polycarbonate substrates (0.6 mm), ZnS—SiO$_2$ (140 nm)/Au—In—Sb—Te (22 nm)/ZnS—SiO$_2$ (25 nm)/Al (100 nm)/ultraviolet hardening resin (10 µm), in that order; and by bonding these two optical recording mediums to each other via bonding layer 8, with the protective layer 7 sides facing to each other; in which the composition of recording layer 4 was Au 7.7, In: 6.6, Sb: 56.6, and Te:29.1.

The evaluation as an optical recording medium was carried out by the aforementioned procedures, under the condition of erasing power of 6 mW, multi-pulse bottom power of 1 mW, and reproduction power of 1 mW, while varying the recording power. The result is shown in Table 10.

TABLE 10

| Recording Power | mW | 8 | 9 | 10 | 11 | 12 |
|---|---|---|---|---|---|---|
| C/N | dB | '43.5 | 51.6 | 53.7 | 54.5 | 55.7 |
| Erase Ratio | dB | −26.9 | −20.6 | −28.4 | −32.8 | −32.7 |
| Modulation Factor | | 0.23 | 0.31 | 0.43 | 0.49 | 0.53 |

There were obtained sufficient C/N, erase ratio, modulation factor, even with a relatively low recording power.

Embodiments 34 to 3-18, and Comparative Examples 1 to 6

There were fabricated optical recording mediums each having a construction of the optical recording medium 1 which was fabricated: by laminating onto each of two sheets of polycarbonate substrates (0.6 mm), ZnS—SiO$_2$ (140 nm)/Au—In—Sb—Te (22 nm)/ZnS—SiO$_2$ (25 nm)/Al (100 nm)/ultraviolet hardening resin (10 μm), in that order; and by bonding these two optical recording mediums to each other via bonding layer 8, with the protective layer 7 sides facing to each other; in which the compositions of recording layer 4 were varied. Further, the evaluation as optical recording mediums were carried out by the aforementioned procedures.

There were used a recording power of 12 mW, erasing power of 6 mW, multi-pulse bottom power of 1 mW, and reproduction power of 1 mW. As disk characteristics, the C/N and recording/erasing repeatability characteristics are shown in Table 11. About the recording/erasing repeatability characteristics, the number of overwriting times, up to a time when the jitter exceeded 15% of the reference clock based on the aforementioned experiment method, are shown by a certain range such as by "1,000 to 10,000".

Sb is 41 atomic %$\leq\gamma\leq$67 atomic %, and the compositional ratio δ of Te is 24 atomic %$\leq\delta\leq$36 atomic % (in which 99 atomic %$\leq\alpha+\beta+\gamma+\delta\leq$100 atomic %); show superior disk characteristics, as compared to those of the comparative examples 3-1 to 3-8 each of which has a recording layer consisting of a composition outside such ranges.

Particularly, the optical recording mediums of embodiments 3-5, 3-6, 3-9, 3-11, 3-18, 3-20, and 3-25 through 3-28, each of which has a recording layer consisting of a composition within such ranges that 2 atomic %$\leq\alpha\leq$10 atomic %, 10 atomic %$\leq\beta\leq$16 atomic %, 45 atomic %$\leq\gamma\leq$59 atomic %, and 26 atomic %$\leq\delta\leq$34 atomic % (in which 99 atomic %$\leq\alpha+\beta+\gamma+\delta\leq$100 atomic %), or such ranges that 1 atomic %$\leq\alpha\leq$13 atomic %, 4 atomic %$\leq\beta<$8 atomic %, 51 atomic %$\leq\gamma\leq$64 atomic %, and 27 atomic %$\leq\delta\leq$30 atomic % (in which 99 atomic %$\leq\alpha+\beta+\gamma+\delta\leq$100 atomic %), have superior characteristics.

There were additionally conducted the following experiments, for comparison with recording layers having different elements.

Comparative Examples 3-9, 3-10

There were fabricated optical recording mediums each having a laminated construction same with the embodiments 3-4 through 3-28, except that recording layers 4 thereof consisted of Ag—In—Sb—Te. Further, the C/N and recording/erasing repeatability characteristics were evaluated under the same condition for the aforementioned embodiments 3-4 through 3-28. The evaluation results are shown in Table 12.

TABLE 11

| | Composition of Recording Layer (atomic %) | | | | Disk Characteristics | |
|---|---|---|---|---|---|---|
| | | | | | | Recording/Erasing Repeatability Characteristics |
| | Au | In | Sb | Te | C/N (dB) | (Number of Times) |
| Embodiment 3-4 | 1.9 | 8.9 | 62.4 | 26.8 | 54.5 | 10,000 to 100,000 |
| Embodiment 3-5 | 2.0 | 10.4 | 58.8 | 27.8 | 53.4 | >100,000 |
| Embodiment 3-6 | 2.1 | 10.9 | 57.6 | 29.4 | 55.8 | >100,000 |
| Embodiment 3-7 | 2.2 | 10.4 | 59.3 | 28.1 | 55.2 | 10,000 to 100,000 |
| Embodiment 3-8 | 2.7 | 16.5 | 50.5 | 30.3 | 53.0 | 1,000 to 10,000 |
| Embodiment 3-9 | 2.8 | 15.8 | 54.8 | 26.6 | 53.4 | >100,000 |
| Embodiment 3-10 | 3.3 | 12.4 | 49.6 | 34.7 | 49.7 | 1,000 to 10,000 |
| Embodiment 3-11 | 4.6 | 10.4 | 55.6 | 29.4 | 54.0 | >100,000 |
| Embodiment 3-12 | 4.6 | 12.2 | 47.9 | 35.3 | 53.7 | 1,000 to 10,000 |
| Embodiment 3-13 | 4.8 | 13.1 | 57.6 | 24.5 | 50.8 | 1,000 to 10,000 |
| Embodiment 3-14 | 5.5 | 12.8 | 55.8 | 25.9 | 52.2 | 1,000 to 10,000 |
| Embodiment 3-15 | 5.7 | 12.3 | 47.1 | 34.9 | 51.7 | 1,000 to 10,000 |
| Embodiment 3-16 | 5.8 | 9.6 | 58.2 | 26.4 | 51.6 | 10,000 to 100,000 |
| Embodiment 3-17 | 7.0 | 9.9 | 56.3 | 26.8 | 52.0 | 10,000 to 100,000 |
| Embodiment 3-18 | 9.6 | 11.4 | 45.2 | 33.8 | 51.2 | >100,000 |
| Embodiment 3-19 | 15.3 | 9.4 | 49.1 | 26.2 | 50.7 | 1,000 to 10,000 |
| Embodiment 3-20 | 1.0 | 7.2 | 63.9 | 27.9 | 56.2 | >100,000 |
| Embodiment 3-21 | 1.6 | 6.5 | 60.3 | 31.6 | 56.5 | 1,000 to 10,000 |
| Embodiment 3-22 | 1.8 | 5.2 | 66.7 | 26.3 | 54.2 | 1,000 to 10,000 |
| Embodiment 3-23 | 2.7 | 7.9 | 58.6 | 30.8 | 55.5 | 1,000 to 10,000 |
| Embodiment 3-24 | 3.4 | 7.3 | 58.8 | 30.5 | 56.0 | 10,000 to 100,000 |
| Embodiment 3-25 | 7.7 | 4.6 | 59.0 | 28.7 | 54.4 | >100,000 |
| Embodiment 3-26 | 7.7 | 6.6 | 56.6 | 29.1 | 54.7 | >100,000 |
| Embodiment 3-27 | 11.5 | 6.6 | 53.3 | 28.6 | 52.5 | >100,000 |
| Embodiment 3-28 | 12.9 | 6.8 | 51.5 | 28.8 | 54.5 | >100,000 |
| Comparative Example 3-1 | 3.0 | 12.9 | 39.3 | 44.8 | 44.4 | <10 |
| Comparative Example 3-2 | 3.6 | 12.4 | 47.2 | 36.8 | 47.2 | <10 |
| Comparative Example 3-3 | 8.0 | 11.4 | 37.3 | 43.3 | 47.3 | <10 |
| Comparative Example 3-4 | 12.0 | 16.9 | 40.6 | 30.5 | 54.5 | <10 |
| Comparative Example 3-5 | 0 | 6.2 | 64.2 | 29.6 | 50.7 | <10 |
| Comparative Example 3-6 | 5.8 | 7.6 | 50.3 | 36.3 | 52.9 | <10 |
| Comparative Example 3-7 | 7.4 | 2.8 | 62.1 | 27.7 | 53.2 | <10 |
| Comparative Example 3-8 | 17.2 | 5.3 | 52.2 | 30.6 | 50.8 | <10 |

From this Table 11, it can be easily seen that: the optical recording mediums of the Embodiments 3-4 to 3-28 each of which has a recording layer consisting of a composition within such ranges that the compositional ratio α of Au is 0 atomic %$<\alpha\leq$17 atomic %, the compositional ratio β of In is 3 atomic %$\leq\beta\leq$17 atomic %, the compositional ratio γ of

TABLE 12

| | Composition of Recording Layer (atomic %) | | | | Disk Characteristics | |
|---|---|---|---|---|---|---|
| | | | | | | Recording/Erasing Repeatability Characteristics |
| | Ag | In | Sb | Te | C/N (dB) | (Number of Times) |
| Comparative Example 3-9 | 7.5 | 10.5 | 54.2 | 27.8 | 53.5 | 1,000 to 2,000 |
| Comparative Example 3-10 | 8.4 | 7.2 | 55.3 | 29.1 | 54.2 | 1,000 to 2,000 |

In the comparative examples 3-9 and 3-10, the number of recording/erasing repeated times is in the range of from 1,000 to 2,000 times, and 2,000 times at the utmost. Contrary, in the embodiments 3-4 through 3-28, there can be attained the recording/erasing repeated times of more than from 1,000 to 10,000 times, showing that these embodiments have disk characteristics superior to the comparative-examples 3-9 and 3-10 having the recording layer of the composition including the different element.

There will be now described hereinafter a concrete embodiment 4 of the optical recording medium: which is particularly preferable when used at the relative speed of from 3 m/sec to 5 m/sec of the recording layer relative to the recording light beam and erasing light beam: namely, the $\alpha$, $\beta$, $\gamma$, and $\delta$ have the following values; 0 atomic %<$\alpha \leq 22$ atomic %, 4 atomic %$\leq \beta \leq 18$ atomic %, 33 atomic %$\leq \gamma \leq 62$ atomic %, and 26 atomic %$\leq \delta \leq 42$ atomic % (in which 99 atomic %$\leq \alpha+\beta+\gamma+\delta \leq 100$ atomic %).

There was fabricated an optical recording medium 1 having the constitution of FIG. 3, in the manner identical with the aforementioned embodiment 3 (in which the relative speed is in the range of from 5 m/s to 7 m/sec). The evaluation of optical recording medium 1 was performed in the manner same with the embodiment 3.

As the disk characteristics, C/N and life span of recording/erasing repeatability were measured by the following procedure.

Namely, the C/N was measured by firstly recording a signal of recording frequency of 4.36 MHz (3T of 8/16 modulation method) at a line speed of 3.8 m/sec, and thereafter measuring the C/N of the reproduction signal when reproduced at a line speed of 3.8 m/sec.

The recording/erasing repeatability characteristics was evaluated by: repeatedly overwriting a random signal with 8/16 modulation method at a line speed of 3.8 m/sec; reproducing at a line speed of 3.8 m/sec at each of predetermined times of overwriting; and measuring jitter of the random signal. The number of times where the jitter exceeded 15% of the reference clock (38.22 n sec) was regarded as the life span of recording/erasing repeatability.

Table 13 shows the composition of the recording layer and the disk characteristics of the embodiment 4-1 which was fabricated in the aforementioned manner.

TABLE 13

| | Composition of Recording Layer (atomic %) | | | | Disk Characteristics | |
|---|---|---|---|---|---|---|
| | | | | | | Recording/Erasing Repeatability Characteristics |
| | Ag | In | Sb | Te | C/N (dB) | (Number of Times) |
| Embodiment 4-1 | 3.3 | 12.4 | 49.6 | 34.7 | 45.3 | >10,000 |

It can be seen that the optical recording medium of this embodiment 4-1 exhibits a superior disk characteristics at the line speed of from 3 m/sec to 5 m/sec.

There will be now described hereinafter a concrete embodiment 5 of this optical recording medium: which is particularly preferable when used at the relative speed of from 7 m/sec to 20 m/sec of the recording layer relative to the recording light beam and erasing light beam: namely, the $\alpha$, $\beta$, $\gamma$, and $\delta$ have the following values; 0 atomic %<$\alpha \leq 25$ atomic %, 1 atomic %$\leq \beta \leq 17$ atomic %, 43 atomic %$\leq \gamma \leq 75$ atomic %, and 15 atomic %$\leq \delta \leq 34$ atomic % (in which 99 atomic %$\leq \alpha+\beta+\gamma+\delta \leq 100$ atomic %).

There was fabricated an optical recording medium 1 having the constitution of FIG. 3, in the manner identical with the aforementioned embodiment 3. The evaluation of optical recording medium 1 was performed in the manner same with the embodiment 3.

As the disk characteristics, C/N and life span of recording/erasing repeatability were measured by the following procedure.

Namely, the C/N was measured by firstly recording a signal of recording frequency of 4.86 MHz (3T of 8/16 modulation method) at a line speed of 9.0 m/sec, and thereafter measuring the C/N of the reproduction signal when reproduced at a line speed of 9.0 m/sec.

The recording/erasing repeatability characteristics was evaluated by: repeatedly overwriting a random signal with 8/16 modulation method at a line speed of 9.0 m/sec; reproducing at a line speed of 9.0 m/sec at each of predetermined times of overwriting; and measuring jitter of the random signal. The number of times up to a time when the jitter exceeded 15% of the reference clock (34.27 n sec) was regarded as the life span of recording/erasing repeatability.

Table 14 shows the composition of the recording layer and the disk characteristics of the embodiment 5-1 which was fabricated in the aforementioned manner.

TABLE 14

| | Composition of Recording Layer (atomic %) | | | | Disk Characteristics | |
|---|---|---|---|---|---|---|
| | | | | | | Recording/Erasing Repeatability Characteristics |
| | Ag | In | Sb | Te | C/N (dB) | (Number of Times) |
| Embodiment 5-1 | 7.7 | 4.6 | 59.0 | 28.7 | 54.9 | >10,000 |

It can be seen that the optical recording medium of this embodiment 5-1 exhibits a superior disk characteristics at the line speed of from 7 m/sec to 20 m/sec.

As explained above, there can be obtained the optical recording mediums which have superior C/N, erase ratio, modulation factor, and recording/erasing repeatability characteristics, by specifying the compositional ratios of Au, In, Sb, and Te.

What are claimed are:

1. An optical recording medium having a recording layer consisting of a composition represented by the formula:

$$Au_\alpha In_\beta Sb_\gamma Te_\delta$$

wherein 0 atomic % < $\alpha$ ≦ 25 atomic %;
1 atomic % ≦ $\beta$ ≦ 18 atomic %;
30 atomic % ≦ $\gamma$ ≦ 75 atomic %; and
15 atomic % ≦ $\delta$ ≦ 45 atomic %;
in which 99 atomic % ≦ $\alpha+\beta+\gamma+\delta$ ≦ 100 atomic %.

2. An optical recording medium of claim 1 wherein said $\alpha$, $\beta$, $\gamma$, and $\delta$ have the following values:

0 atomic % < $\alpha$ ≦ 8 atomic %;
10 atomic % ≦ $\beta$ ≦ 18 atomic %;
42 atomic % ≦ $\gamma$ ≦ 49 atomic %; and
34 atomic % ≦ $\delta$ ≦ 41 atomic %;
in which 99 atomic % ≦ $\alpha+\beta+\gamma+\delta$ ≦ 100 atomic %.

3. An optical recording medium of claim 1 wherein said $\alpha$, $\beta$, $\gamma$, and $\delta$ have the following values:

0 atomic % < $\alpha$ ≦ 25 atomic %;
7 atomic % ≦ $\beta$ ≦ 18 atomic %; and
32 atomic % ≦ $\gamma$ ≦ 45 atomic %, when 30 atomic % ≦ $\gamma$ < 45 atomic %;
30 atomic % ≦ $\delta$ ≦ 45 atomic %, when 45 atomic % ≦ $\gamma$ < 49 atomic %;
35 atomic % ≦ $\delta$ ≦ 45 atomic %, when 49 atomic % ≦ $\gamma$ ≦ 55 atomic %;
in which 99 atomic % ≦ $\alpha+\beta+\gamma+\delta$ ≦ 100 atomic %.

4. A recording and erasing method for an optical recording medium which comprises a recording layer, said method comprising the steps of:

preparing said recording layer to consist of a composition represented by the formula:

$$Au_\alpha In_\beta Sb_\gamma Te_\delta$$

wherein 0 atomic % < $\alpha$ ≦ 25 atomic %;
1 atomic % ≦ $\beta$ ≦ 18 atomic %;
30 atomic % ≦ $\gamma$ ≦ 75 atomic %; and
15 atomic % ≦ $\delta$ ≦ 45 atomic %;
in which 99 atomic % ≦ $\alpha+\beta+\gamma+\delta$ ≦ 100 atomic %, and performing recording and erasing of information to and from said recording layer at a speed of from 1 m/sec to 20 m/sec of said recording layer relative to the light beam.

5. A recording and erasing method for an optical recording medium of claim 4, wherein said $\alpha$, $\beta$, $\gamma$, and $\delta$ have the following values:

0 atomic % < $\alpha$ ≦ 25 atomic %;
7 atomic % ≦ $\beta$ ≦ 18 atomic %; and
32 atomic % ≦ $\delta$ ≦ 45 atomic %, when 30 atomic % ≦ $\gamma$ < 45 atomic %;
30 atomic % ≦ $\delta$ ≦ 45 atomic %, when 45 atomic % ≦ $\gamma$ < 49 atomic %;
35 atomic % ≦ $\delta$ ≦ 45 atomic %, when 49 atomic % ≦ $\delta$ ≦ 55 atomic %;
in which 99 atomic % ≦ $\alpha+\beta+\gamma+\delta$ ≦ 100 atomic %, and
wherein said relative speed during said recording and erasing of information to and from said recording layer is from 1 m/sec to 3 m/sec.

6. A recording and erasing method for an optical recording medium of claim 4, wherein said $\alpha$, $\beta$, $\gamma$, and $\delta$ have the following values:

0 atomic % < $\alpha$ ≦ 17 atomic %;
3 atomic % ≦ $\beta$ ≦ 17 atomic %;
41 atomic % ≦ $\gamma$ ≦ 67 atomic %; and
24 atomic % ≦ $\delta$ ≦ 36 atomic %;
in which 99 atomic % ≦ $\alpha+\beta+\gamma+\delta$ ≦ 100 atomic and
wherein said relative speed during said recording and erasing of information to and from said recording layer is from 5 m/sec to 7 m/sec.

7. A recording and erasing method for an optical recording medium of claim 4, wherein said $\alpha$, $\beta$, $\gamma$, and $\delta$ have the following values:

0 atomic % < $\alpha$ ≦ 22 atomic %;
4 atomic % ≦ $\beta$ ≦ 18 atomic %;
33 atomic % ≦ $\gamma$ ≦ 62 atomic %; and
26 atomic % ≦ $\delta$ ≦ 42 atomic %;
in which 99 atomic % ≦ $\alpha+\beta+\gamma+\delta$ ≦ 100 atomic %, and
wherein said relative speed during said recording and erasing of information to and from said recording layer is from 3 m/sec to 5 m/sec.

8. A recording and erasing method for an optical recording medium of claim 4, wherein said $\alpha$, $\beta$, $\gamma$, and $\delta$ have the following values:

0 atomic % < $\alpha$ ≦ 25 atomic %;
1 atomic % ≦ $\beta$ ≦ 17 atomic %;
43 atomic % ≦ $\gamma$ ≦ 75 atomic %; and
15 atomic % ≦ $\delta$ ≦ 34 atomic %;
in which 99 atomic % ≦ $\alpha+\beta+\gamma+\delta$ ≦ 100 atomic %, and
wherein said relative speed during said recording and erasing of information to and from said recording layer is from 7 m/sec to 20 m/sec.

* * * * *